United States Patent
Hsu

(10) Patent No.: US 8,428,250 B2
(45) Date of Patent: Apr. 23, 2013

(54) PIVOT BRAKING STRUCTURE OF RELATIVE SLIDING DEVICE

(75) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 124 days.

(21) Appl. No.: 13/186,568

(22) Filed: Jul. 20, 2011

(65) Prior Publication Data

US 2013/0019436 A1     Jan. 24, 2013

(51) Int. Cl.
*H04M 1/00*     (2006.01)
*H04M 9/00*     (2006.01)

(52) U.S. Cl.
USPC .................................. 379/433.12; 455/575.4

(58) Field of Classification Search ............. 379/433.11, 379/433.12; 455/550.1, 575.1, 575.4; 361/724, 361/725, 727, 679.39
See application file for complete search history.

(56) References Cited

U.S. PATENT DOCUMENTS

| 7,526,082 | B2 * | 4/2009 | Abe et al. ................. 379/433.11 |
| 2003/0064688 | A1 * | 4/2003 | Mizuta et al. .................... 455/90 |
| 2010/0087232 | A1 * | 4/2010 | Yeh et al. ................... 455/575.4 |

* cited by examiner

*Primary Examiner* — Tuan D Nguyen
(74) *Attorney, Agent, or Firm* — Rosenberg, Klein & Lee

(57) ABSTRACT

A pivot braking structure includes a sliding-guided frame, a sliding seat, a pivot-shaft assembly and a movable cover. The sliding seat slides along a sliding rail of the sliding-guided frame and connected to a shaft hole of the sliding seat. The pivot-shaft assembly is provided with a pivot shaft passing through the shaft hole of the sliding seat. The movable cover is pivotally jacketed to the pivot shaft. Recesses are provided on a positioning member and protrusions are provided on the movable cover, so that the movable cover is positioned at a predetermined opening angle relative to the sliding seat by pivoting the protrusions of the movable cover to embed in the recesses of the positioning member. The movable cover is provided with a clip portion having an accommodation portion jacketed to the edge of the sliding-guided frame when the movable cover is attachably received to the sliding seat.

27 Claims, 3 Drawing Sheets

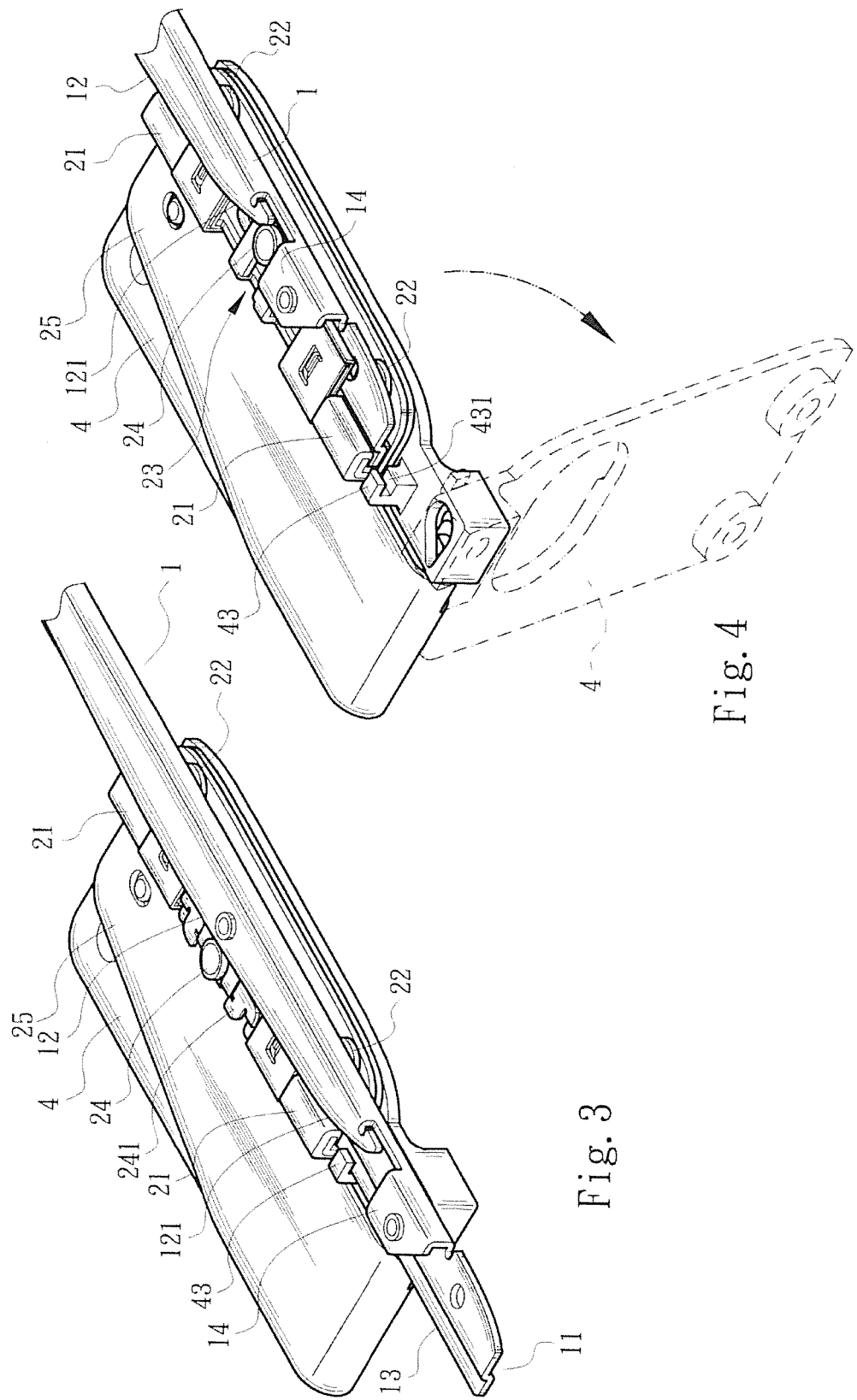

PIVOT BRAKING STRUCTURE OF RELATIVE SLIDING DEVICE

BACKGROUND OF THE INVENTION

1. Field of the Invention

The present invention relates to a pivot braking structure of a relative sliding device, and in particular relates to a pivot braking structure capable of enabling two relative sliding mechanisms with a stable sliding and pivotal-lifting positioning.

2. Description of the Related Art

Various sliding-cover structures are commonly applied in different electronic devices. For example, "SLIDING MODULE AND PROTABLE ELECTRONIC DEVICE USING THE SAME" disclosed by Taiwan Patent Publication No. I328088 is an invention patent case, providing a fixed mechanism fixedly connected with a fixed frame and a moving mechanism fixedly connected with a movable fixed frame. Inversely-bent hook portions disposed at both sides of the fixed frame are utilized to jacket and accommodate the edge of the two sides of the movable frame, so that the moving mechanism can be moved between a first position and a second position on the fixed frame via the movable frame relative to the fixed mechanism, and a driving force required by the moving mechanism can be provided by a wire torsion elastic member.

Further, "SLIDING-COVER DEVICE" disclosed by Taiwan Patent Publication No. I280031 is an invention patent case, including a base plate provided with guiding slot and sliding rail, an upper cover provided with a long slotted hole, and an elastic member disposed on the long slotted hole of the upper cover. The upper cover can be embedded in the sliding rail of the base plate. The guiding slot of the base plate is formed with a curve path having a surpass point. The elastic member includes two springs having fixed ends to be fixedly disposed on the outside end of the long slotted hole of the upper cover, respectively. Slide-roll members, which are respectively disposed on the free ends of the two springs and extended along in the long slotted hole of the upper cover, are displaced along the guiding slot of the base plate and pulls the springs to expand or contract when the upper cover is moved. In any case, when the slide-roll members crosses over the surpass point of the guiding slot of the base plate, the upper cover and the base plate can be automatically extended or contracted by the pulling of the elastic members.

It can be observed that the described structures above provides a simple assembly structure of two sliding members capable of relative sliding, merely satisfying the requirements of basic sliding opening of the sliding cover mechanism for conventional electronic devices. However, for various of advanced and rapid-changing electronic devices, the described sliding cover mechanism of simple sliding opening cannot meet their functional requirements, e.g., to slide a sliding cover at an adequate distance prior to pivotal opening the sliding cover. Therefore, it is essential to improve these conventional mechanisms with competitiveness for applying on complicated requirements and conditions.

BRIEF SUMMARY OF THE INVENTION

In view of this, the invention provides a pivot braking structure for overcoming the disadvantages of the conventional sliding cover structures.

The main purpose of the present invention is to provide a pivot braking structure of a relative sliding device capable of enabling two relative sliding mechanisms with a stable sliding, wherein one of the sliding mechanisms is further provided with a pivotal (lifting) auxiliary mechanism capable of forming various application patterns for any different requirements.

Another purpose of the present invention is to provide a pivot braking structure of a relative sliding device, wherein the pivotal (lifting) auxiliary mechanism thereof is capable of being positioned at least one opening angle to increase operation convenience.

Still another purpose of the present invention is to provide a pivot braking structure of a relative sliding device, to prevent a downward covering of the pivotal (lifting) auxiliary mechanism and to attain a fool-proofing effect of avoiding collisions and damages in the sliding process.

Still another purpose of the present invention is to provide a pivot braking structure of a relative sliding device, to have a labor-saving way by generating a driving force to continuously move the components at the terminal of the sliding process.

To attain the purpose above, the technical way adopted by the present invention comprises a sliding-guided frame, a sliding seat, a pivot-shaft assembly and a movable cover. The sliding-guided frame at least comprises an edge and a sliding rail parallel to the edge. The sliding seat is connected to the sliding-guided frame to reciprocally slide along an extension direction of the sliding rail of the sliding-guided frame and connected to a shaft hole extendedly intersected with the edge of the sliding-guided frame. The pivot-shaft assembly at least comprises a pivot shaft passing through the shaft hole of the sliding seat. The movable cover has a round shaft hole capable of being jacketed to the pivot shaft of the pivot-shaft assembly and a clip portion having an accommodation portion to be located beside the round shaft hole. The accommodation portion of the clip portion is correspondingly jacketed to the edge of the sliding-guided frame when the movable cover is attachably received to the sliding seat.

According to the structure above, the pivot-shaft assembly connectively passes through at least one positioning member fixed in the vicinity of one side of the round shaft hole of the movable cover, at least two symmetrical recesses are provided on a surface at one side of the positioning member in the vicinity of the round shaft hole of the movable cover, and at least two symmetrical protrusions are provided on an outside of the round shaft hole of the movable cover, so that the movable cover is positioned at a predetermined opening angle relative to the sliding seat by pivoting the protrusions of the movable cover to embed in the recesses of the positioning member.

According to the structure above, at least one washer is provided on one side of the positioning member in the vicinity of the round shaft hole of the movable cover and has recesses equal to the recesses provided on the surface of the positioning member.

According to the structure above, at least one indentation is provided on an edge at one end of the shaft hole of the sliding seat in the vicinity of the round shaft hole of the movable cover, and an abutment enterable into the indentation of the sliding seat is provided on the positioning member to form a positioning of the positioning member incapable of being pivoted at the end of the shaft hole of the sliding seat.

According to the structure above, at least one flat surface is provided on a peripheral side of the pivot shaft, and a long hole corresponding to a sectional shape of the pivot shaft is provided on the positioning member, so that the positioning member is jacketed to the pivot shaft to form a combination incapable of being relatively pivoted.

According to the structure above, the sliding seat is provided with at least one sliding-guided member capable of being abutted against the sliding rail of the sliding-guided frame.

According to the structure above, the sliding-guided frame is further provided with a sliding-guided portion juxtaposed to the sliding rail, and the sliding seat is further provided with at least one elastic adjusting member abutted against the sliding-guided portion in a direction opposite to that of the sliding-guided member abutted against the sliding rail of the sliding-guided frame.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 3 is a schematic top view showing a sliding seat of the invention to be opened for positioning; and FIG. 4 is a schematic view showing a sliding seat of the invention being opened.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
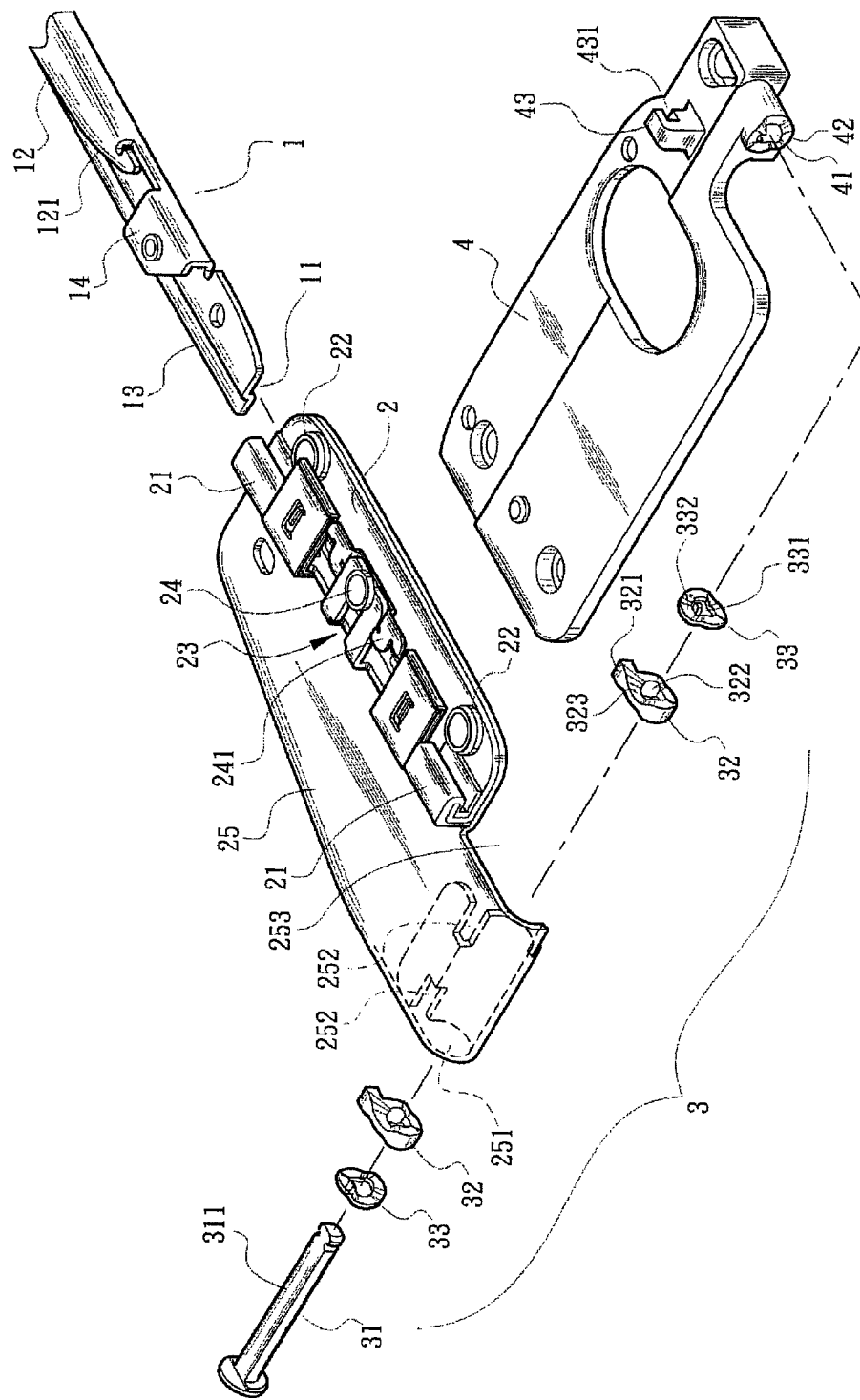
FIG. 1 is a structural exploded view of a first embodiment of the invention.
Figure 2:
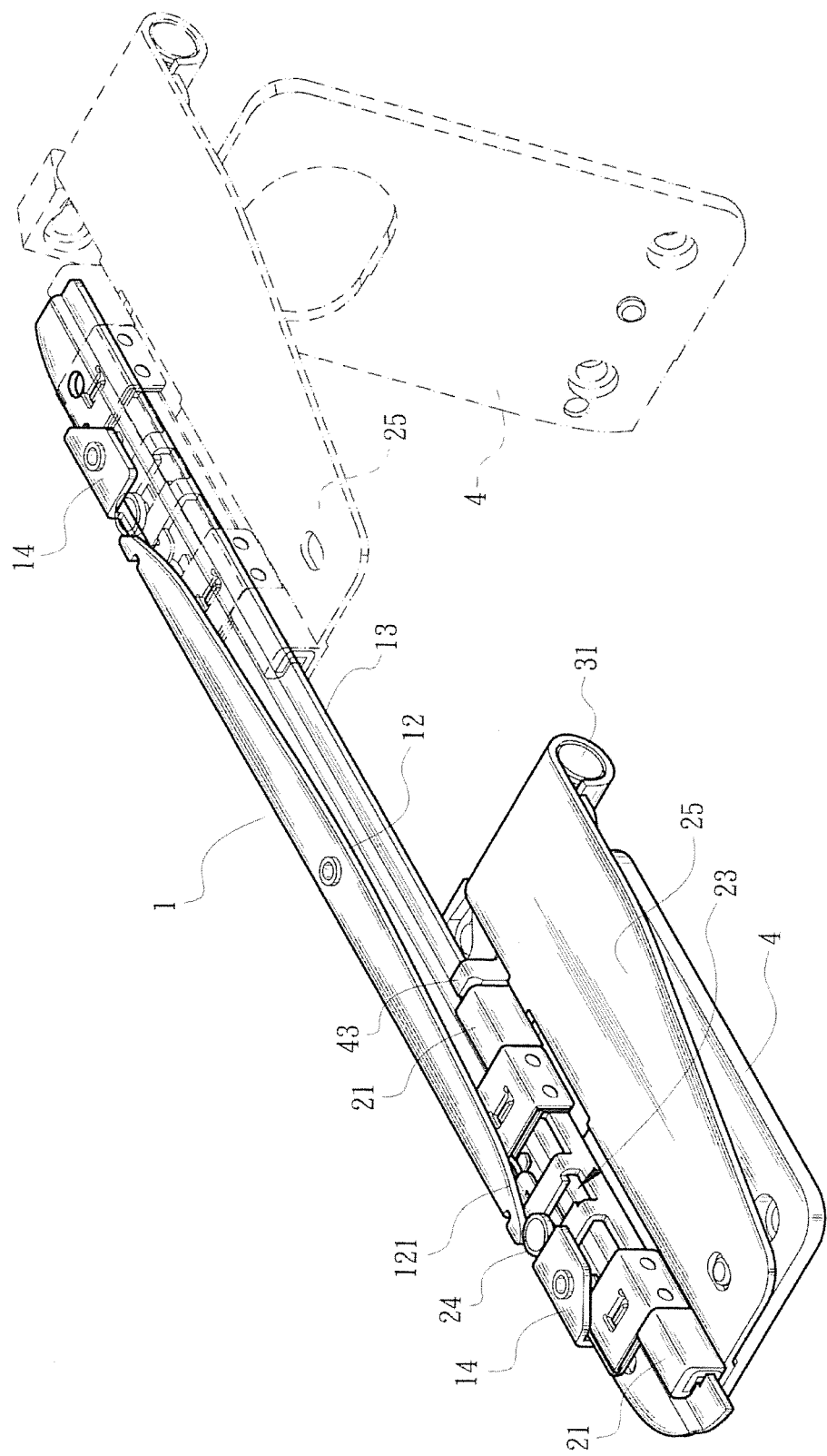
FIG. 2 is a schematic bottom view showing an integral assembly of the invention.

Referring to FIGS. 1 and 2, a pivot braking structure of a relative sliding device mainly comprises a sliding-guided frame 1, a sliding seat 2, a pivot-shaft assembly 3 and a movable cover 4. The sliding-guided frame 1 at least comprises an edge 13 and a sliding rail 11 parallel to the edge 13, and the sliding seat 2 is connected to the sliding-guided frame 1 to reciprocally slide along an extension direction of the sliding rail 11 of the sliding-guided frame 1 and connected to the pivot-shaft assembly 3 intersected with the edge 13 of the sliding-guided frame 1. In actual applications, the sliding-guided frame 1 is further provided with a sliding-guided portion 12 juxtaposed to the sliding rail 11 and having two ends respectively provided with a curved portion 121, and two protruded stoppers 14 are respectively provided next to the outsides of the two ends of the sliding-guided portion 12. Further, two jacketing portions 21 are respectively provided on two ends of the sliding seat 2 to jacket to the edge 13 of the sliding-guided frame 1, and two sliding-guided members 22, such as rollers to be pivoted, are respectively provided on two ends of the sliding seat 2 to respectively abut against the sliding rail 11 of the sliding-guided frame 1. The sliding seat 2 has a middle section provided with a guiding slot 23 relatively extended and perpendicular to the sliding-guided portion 12 of the sliding-guided frame 1. An adjusting seat 241 is provided next to the guiding slot 23. The sliding seat 2 is further provided with an adjusting member 24, such as rollers to be pivoted, pivoted on the adjusting seat 241 and passing through the guiding slot 23 to be outwardly projected. With a prescribed elastic member (not shown in Figs.) exerting an elasticity on the adjusting seat 241, the adjusting member 24 linked by the adjusting seat 241 is abutted against the sliding-guided portion 12 in a direction opposite to that of the sliding-guided member 22 abutted against the sliding rail 11 of the sliding-guided frame 1, thus forming a stable, mutual-sliding combination structure of the sliding seat 2 and the sliding-guided frame 1. A link portion 25 is laterally extended beside the sliding seat 2, if necessary. The link portion 25 comprises a shaft hole 251 perpendicularly and extendedly intersected with the edge 13 of the sliding-guided frame 1, a hollow portion 253 provided between the shaft hole 251 and the sliding seat 2, and two indentations 252 respectively provided on edges at two ends of the shaft hole 251. The pivot-shaft assembly 3 comprises a pivot shaft 31 passing through the shaft hole 251 of the link portion 25 and two positioning members 32 respectively disposed at two ends of the pivot shaft 31. An outwardly-projected abutment 321 is provided on the positioning member 32, embeddable or enterable into the indentation 252 disposed next to the shaft hole 251 of the link portion 25 for positioning. At least one flat surface 311 is provided on a peripheral side of the pivot shaft 31, and a long hole 322 corresponding to a sectional shape of the pivot shaft 31 is provided on the positioning member 32, so that the positioning member 32 can be jacketed to the pivot shaft 31 to form a combination incapable of being relatively pivoted. The movable cover 4 has a round shaft hole 41 pivotally jacketed to the pivot shaft 31 of the pivot-shaft assembly 3, and a clip portion 43 having an accommodation portion 431 is disposed beside a connection position of the movable cover 4 and the pivot shaft 31 of the pivot-shaft assembly 3. At least two symmetrical recesses 323 are provided on a surface at one side of the positioning member 32 in the vicinity of the sliding-guided frame 1 and of the round shaft hole 41 of the movable cover 4. At least two symmetrical protrusions 42, respectively corresponding to the recesses 323 provided on the positioning member 32, are provided on an outside of the round shaft hole 41 of the movable cover 4. At least one washer 33 is provided between the movable cover 4 and the positioning member 32, i.e. is provided on one side of the positioning member 32 in the vicinity of the round shaft hole 41 of the movable cover 4, if necessary. The washer 33 has a long hole 331 and a plurality of recesses 332, wherein the long hole 331 and the recesses 332 are equal to the long hole 322 and the recesses 323 provided on the positioning member 32, respectively. The location of the clip portion 43 to be disposed is relative to the hollow portion 253 of the link portion 25, and the accommodation portion 431 of the clip portion 43 is correspondingly jacketed to the edge 13 of the sliding-guided frame 1 when the movable cover 4 is attachably received to the sliding seat 2.

Referring to FIGS. 3 and 4, in the operation of the structure above, the adjusting member 24 linked by the adjusting seat 241 is abutted against the sliding-guided portion 12, together with the sliding-guided member 22 abutted against the sliding rail 11 of the sliding-guided frame 1 in opposite direction, thus forming a stable, mutual-sliding combination of the sliding seat 2 and the sliding-guided frame 1. When the sliding seat 2 sliding along the sliding rail 11 of the sliding-guided frame 1 approaches the end of the sliding-guided frame 1, the adjusting member 24 simultaneously slides to the curved portion 121 provided on the end of the sliding-guided portion 12 of the sliding-guided frame 1, and the curved portion 121 exerts a reacting force on the adjusting member 24 to drive the sliding seat 2 to continuously slide along the sliding rail 11 of the sliding-rail frame 1 via the adjusting seat 241 without adding any external force on the sliding seat 2, and the sliding seat 2 cannot be further slid until the adjusting member 24 is stopped by the stopper 14, thus forming the relative sliding device with a force-saving structure provided with an automatic driving effect at the terminal of the sliding process. In the sliding process above, the movable cover 4 is attachingly covered on the sliding seat 2 (the link portion 25) in a normal condition, to cause the accommodation portion 431 of the clip portion 43 correspondingly jacketed to the edge 13 of the sliding-guided frame 1. Therefore, in the sliding process, the pivotal lifting of the movable cover 4 and unwanted collisions therewith can be prevented.

When the sliding seat 2 sliding along the sliding rail 11 of the sliding-guided frame 1 is arrived at a position to be opened, the accommodation portion 431 of the clip portion 43 is simultaneously separated from the edge 13 of the sliding-guided frame 1 to move in the hollow portion 253 of the link portion 25 (shown in FIG. 4), so that the movable cover 4 can take the pivot shaft 31 of the pivot-shaft assembly 3 as an axis for pivoting; meanwhile, in the pivoting process, the movable cover 4 can be positioned at a predetermined or any opening angle relative to the sliding seat 2 by pivoting the protrusions 42 of the movable cover 4 to embed in the recesses 323 of the positioning member 32, thereby increasing the operation convenience. Further, as the movable cover 4 is in an opening status, i.e., as the accommodation portion 431 of the clip portion 43 does not correspond to the edge 13 of the sliding-guided frame 1, if the sliding seat 2 is contacted accidentally to move along the sliding rail 11 of the sliding-guided frame 1, the movable cover 4 cannot cover the sliding seat 2 the link portion 25 because the movement of the clip portion 43 is stopped by the edge 13 of the sliding-guided frame 1. Thus, during the process of the movable cover 4 sliding on the sliding seat 2, the damages caused by unwanted collisions of the movable cover 4 can be prevented.

In summary, the pivot braking structure of the relative sliding device of the invention can provide multiple functions such as a stable sliding, an opening angle positioning and a fool-proofing effect to prevent undesired contact on the cover during the sliding process. While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pivot braking structure of a relative sliding device, at least comprising:
   a sliding-guided frame at least comprising an edge and a sliding rail parallel to the edge;
   a sliding seat connected to the sliding-guided frame to reciprocally slide along an extension direction of the sliding rail of the sliding-guided frame and connected to a pivot-shaft assembly intersected with the edge of the sliding-guided frame, the pivot-shaft assembly at least comprising a pivot shaft; and
   a movable cover connectively jacketed to the pivot shaft of the pivot-shaft assembly, a clip portion disposed beside a connection position of the movable cover and the pivot shaft of the pivot-shaft assembly and comprising an accommodation portion correspondingly jacketed to the edge of the sliding-guided frame when the movable cover is attachably received to the sliding seat.

2. The pivot braking structure of the relative sliding device as claimed in claim 1, wherein the sliding seat comprises a shaft hole extendedly intersected with the edge of the sliding-guided frame and the movable cover comprises a round shaft hole, the pivot shaft of the pivot-shaft assembly passes through the shaft hole of the sliding seat and connectively passes through at least one positioning member fixed in the vicinity of one side of the round shaft hole of the movable cover, at least two symmetrical recesses are provided on a surface at one side of the positioning member in the vicinity of the round shaft hole of the movable cover, and at least two symmetrical protrusions are provided on an outside of the round shaft hole of the movable cover, so that the movable cover is positioned at a predetermined opening angle relative to the sliding seat by pivoting the protrusions of the movable cover to embed in the recesses of the positioning member.

3. The pivot braking structure of the relative sliding device as claimed in claim 2, wherein at least one washer is provided on one side of the positioning member in the vicinity of the round shaft hole of the movable cover and has recesses equal to the recesses provided on the surface of the positioning member.

4. The pivot braking structure of the relative sliding device as claimed in claim 2, wherein at least one indentation is provided on an edge at one end of the shaft hole of the sliding seat in the vicinity of the round shaft hole of the movable cover, and an abutment enterable into the indentation of the sliding seat is provided on the positioning member to form a positioning of the positioning member incapable of being pivoted at the end of the shaft hole of the sliding seat.

5. The pivot braking structure of the relative sliding device as claimed in claim 3, wherein at least one indentation is provided on an edge at one end of the shaft hole of the sliding seat in the vicinity of the round shaft hole of the movable cover, and an abutment enterable into the indentation of the sliding seat is provided on the positioning member to form a positioning of the positioning member incapable of being pivoted at the end of the shaft hole of the sliding seat.

6. The pivot braking structure of the relative sliding device as claimed in claim 2, wherein at least one flat surface is provided on a peripheral side of the pivot shaft, and a long hole corresponding to a sectional shape of the pivot shaft is provided on the positioning member, so that the positioning member is jacketed to the pivot shaft to form a combination incapable of being relatively pivoted.

7. The pivot braking structure of the relative sliding device as claimed in claim 3, wherein at least one flat surface is provided on a peripheral side of the pivot shaft, and a long hole corresponding to a sectional shape of the pivot shaft is provided on the positioning member, so that the positioning member is jacketed to the pivot shaft to form a combination incapable of being relatively pivoted.

8. The pivot braking structure of the relative sliding device as claimed in claim 4, wherein at least one flat surface is provided on a peripheral side of the pivot shaft, and a long hole corresponding to a sectional shape of the pivot shaft is provided on the positioning member, so that the positioning member is jacketed to the pivot shaft to form a combination incapable of being relatively pivoted.

9. The pivot braking structure of the relative sliding device as claimed in claim 5, wherein at least one flat surface is provided on a peripheral side of the pivot shaft, and a long hole corresponding to a sectional shape of the pivot shaft is provided on the positioning member, so that the positioning member is jacketed to the pivot shaft to form a combination incapable of being relatively pivoted.

10. The pivot braking structure of the relative sliding device as claimed in claim 1, wherein the sliding seat is provided with at least one sliding-guided member capable of being abutted against the sliding rail of the sliding-guided frame.

11. The pivot braking structure of the relative sliding device as claimed in claim 2, wherein the sliding seat is provided with at least one sliding-guided member capable of being abutted against the sliding rail of the sliding-guided frame.

12. The pivot braking structure of the relative sliding device as claimed in claim 3, wherein the sliding seat is provided with at least one sliding-guided member capable of being abutted against the sliding rail of the sliding-guided frame.

13. The pivot braking structure of the relative sliding device as claimed in claim 4, wherein the sliding seat is provided with at least one sliding-guided member capable of being abutted against the sliding rail of the sliding-guided frame.

14. The pivot braking structure of the relative sliding device as claimed in claim 5, wherein the sliding seat is provided with at least one sliding-guided member capable of being abutted against the sliding rail of the sliding-guided frame.

15. The pivot braking structure of the relative sliding device as claimed in claim 6, wherein the sliding seat is provided with at least one sliding-guided member capable of being abutted against the sliding rail of the sliding-guided frame.

16. The pivot braking structure of the relative sliding device as claimed in claim 7, wherein the sliding seat is provided with at least one sliding-guided member capable of being abutted against the sliding rail of the sliding-guided frame.

17. The pivot braking structure of the relative sliding device as claimed in claim 8, wherein the sliding seat is provided with at least one sliding-guided member capable of being abutted against the sliding rail of the sliding-guided frame.

18. The pivot braking structure of the relative sliding device as claimed in claim 9, wherein the sliding seat is provided with at least one sliding-guided member capable of being abutted against the sliding rail of the sliding-guided frame.

19. The pivot braking structure of the relative sliding device as claimed in claim 10, wherein the sliding-guided frame is further provided with a sliding-guided portion juxtaposed to the sliding rail, and the sliding seat is further provided with at least one elastic adjusting member abutted against the sliding-guided portion in a direction opposite to that of the sliding-guided member abutted against the sliding rail of the sliding-guided frame.

20. The pivot braking structure of the relative sliding device as claimed in claim 11, wherein the sliding-guided frame is further provided with a sliding-guided portion juxtaposed to the sliding rail, and the sliding seat is further provided with at least one elastic adjusting member abutted against the sliding-guided portion in a direction opposite to that of the sliding-guided member abutted against the sliding rail of the sliding-guided frame.

21. The pivot braking structure of the relative sliding device as claimed in claim 12, wherein the sliding-guided frame is further provided with a sliding-guided portion juxtaposed to the sliding rail, and the sliding seat is further provided with at least one elastic adjusting member abutted against the sliding-guided portion in a direction opposite to that of the sliding-guided member abutted against the sliding rail of the sliding-guided frame.

22. The pivot braking structure of the relative sliding device as claimed in claim 13, wherein the sliding-guided frame is further provided with a sliding-guided portion juxtaposed to the sliding rail, and the sliding seat is further provided with at least one elastic adjusting member abutted against the sliding-guided portion in a direction opposite to that of the sliding-guided member abutted against the sliding rail of the sliding-guided frame.

23. The pivot braking structure of the relative sliding device as claimed in claim 14, wherein the sliding-guided frame is further provided with a sliding-guided portion juxtaposed to the sliding rail, and the sliding seat is further provided with at least one elastic adjusting member abutted against the sliding-guided portion in a direction opposite to that of the sliding-guided member abutted against the sliding rail of the sliding-guided frame.

24. The pivot braking structure of the relative sliding device as claimed in claim 15, wherein the sliding-guided frame is further provided with a sliding-guided portion juxtaposed to the sliding rail, and the sliding seat is further provided with at least one elastic adjusting member abutted against the sliding-guided portion in a direction opposite to that of the sliding-guided member abutted against the sliding rail of the sliding-guided frame.

25. The pivot braking structure of the relative sliding device as claimed in claim 16, wherein the sliding-guided frame is further provided with a sliding-guided portion juxtaposed to the sliding rail, and the sliding seat is further provided with at least one elastic adjusting member abutted against the sliding-guided portion in a direction opposite to that of the sliding-guided member abutted against the sliding rail of the sliding-guided frame.

26. The pivot braking structure of the relative sliding device as claimed in claim 17, wherein the sliding-guided frame is further provided with a sliding-guided portion juxtaposed to the sliding rail, and the sliding seat is further provided with at least one elastic adjusting member abutted against the sliding-guided portion in a direction opposite to that of the sliding-guided member abutted against the sliding rail of the sliding-guided frame.

27. The pivot braking structure of the relative sliding device as claimed in claim 18, wherein the sliding-guided frame is further provided with a sliding-guided portion juxtaposed to the sliding rail, and the sliding seat is further provided with at least one elastic adjusting member abutted against the sliding-guided portion in a direction opposite to that of the sliding-guided member abutted against the sliding rail of the sliding-guided frame.

* * * * *